Nov. 10, 1953 M. NĚMECKÝ 2,658,282
DIAL INDICATOR
Filed Feb. 28, 1949
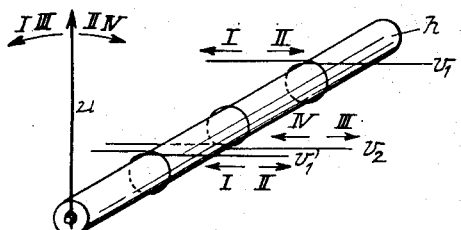
FIG. 1.
FIG. 2.
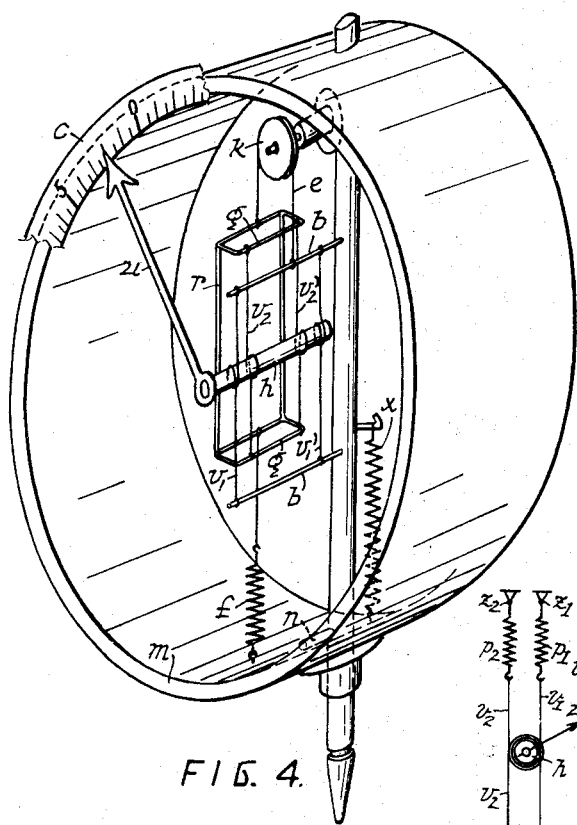
FIG. 3.
FIG. 4.
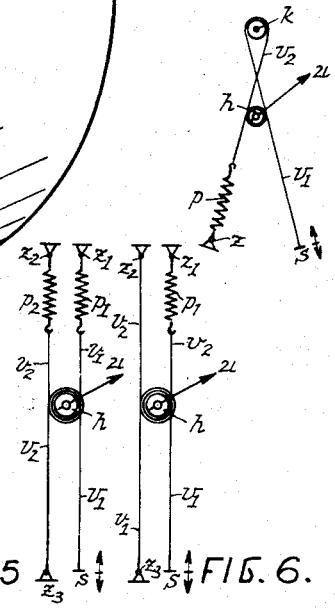
FIG. 5. FIG. 6.
Miroslav Německý

Patented Nov. 10, 1953

2,658,282

UNITED STATES PATENT OFFICE 2,658,282

DIAL INDICATOR

Miroslav Německý, Nove Mesto na Morave, Czechoslovakia

Application February 28, 1949, Serial No. 78,848

Claims priority, application Czechoslovakia March 5, 1948

11 Claims. (Cl. 33—172)

The present invention relates to improvements in gages of the kind provided with indication means such as pointer, scale, mirror or the like.

One object of the present invention is to provide a gage of this kind showing a high degree of accuracy.

A further object of the invention is to provide a gage which may be manufactured in an extremely simple way and is particularly suitable for mass production.

Another object of the invention is to provide a gage having a very small number of components and therefore, subject to minimum wear in use. The invention is suitable for use in connection with numerous kinds of gages such as dial gages, gap gages, gaging fixtures, compound gages, etc.

Further objects and advantages of the invention will appear from the ensuing description.

Practically in all gages of the above named kind there is a transmission mechanism interposed between the pointer or the like member indicating the magnitude of the gaged value on a scale and the member which is displaced in dependence on the measured value, said transmission mechanism being adapted to impart movement to the pointer and in most cases also to magnify or multiply the movement of the member displaced in dependence on the measured value. Such transmission mechanisms comprise lever systems or a gearing or both. In all cases the transmission mechanisms comprise a number of journals, joints, or similar connections which are a source of inaccuracies in the transmission caused by mechanical hysteresis, apart from soon becoming worn out. The mechanical hysteresis is caused by an elastic deformation of the measuring apparatus, of the object to be measured and possibly of the carrier, which elastic deformation results from the friction which is added or subtracted from the directive force or bias of the measuring system. It is therefore necessary to provide such systems with a minimal friction and minimal elasticity of the parts concerned.

It has already been suggested to employ flexible means, such as a string or cord for transmitting movement of the member, displaced in dependence on the measured value, to a rotatable or rockable pointer, said flexible means being attached at one of its ends to the displaced member of the gage and wound once or several times around a shaft of the pointer or around a roller secured thereon, and mounted for movement at its other end so as to move as a unit under the influence of movement of the operative member of the gage.

Said other end of the flexible means is for this purpose loaded by a spring or weight and if required a roller is interposed into the apparatus to change the direction of the free end of the flexible means.

Neither this arrangement removes, however, the above mentioned drawbacks of the hitherto known gages, provided with journals or links in their transmission mechanisms. The reason, therefore is that even in this case the shaft of the pointer has to be mounted in one or two bearings so that such an apparatus comprises again a journal and bearings in frictional engagement, and subject to wear, just in the essential portion of the apparatus, which has of course an adverse influence on the accuracy of the gage.

The above said drawbacks of the hitherto known gages of this kind are removed according to the invention.

The gage according to the invention comprises an indicating element, e. g. a pointer, mirror or the like, operatively connected with a shaft, to which rotational movement is imparted by a fibre wound at least once around said shaft and movable in longitudinal direction by the member displacement of which corresponds to the value to be measured, the main feature of the invention residing therein that the shaft is carried by two systems of fibres, each of which consists of at least one fibre, the fibres of both systems being wound around the shaft at its opposite sides, while at least one system is movable by the member the displacement of which has to be measured, whereas the other system of fibres is stationary as its ends could be attached to immovable carriers, or movable by the said member directly or indirectly in opposite direction, preferably through the same distance as the first named system.

In consequence of this arrangement it is achieved that the shaft of the pointer need not be mounted in any bearing at all, but is directly carried by the flexible means employed for transmitting movement of the displaceable member to the shaft.

Such a countermovement of the second system of fibres may be achieved for instance by connecting the two systems with members of the gage moving in opposite direction, for instance by connecting the two systems with members of the gage moving in opposite direction, for instance with two arms of a gap gage, or the second system of fibres may be connected with the first system by the intermediary of a flexible connecting element wound around a roller or the connection between the two systems may be provided directly by the shaft of the pointer.

One of the two systems contains preferably at least two flexible means whereas the other system comprises at least one flexible means which could, for example be located between the two means of the first named system.

The two systems carry the shaft of the indicating element (pointer, mirror) and thereby the indicating element itself without any further mounting, the shaft or indicating element being always rotated exactly through an angle or distance corresponding to the longitudinal movement of the flexible means of said systems.

In order that the invention may be clearly understood and readily carried into effect, several examples of gages embodying the invention will now be described with reference to the accompanying drawings, wherein:

Fig. 1 shows diagrammatically the two systems of flexible means and the manner in which the systems carry the shaft with the indicator, Fig. 2 shows an alternative arrangement of winding, Fig. 3 shows a modified arrangement for producing countermovement of the two systems of flexible elements, Fig. 4 shows in a perspective view, partially in section, the employment of the invention for a dial gage and Figs. 5 and 6 show other modifications of the arrangement of the two systems of flexible elements.

The essential feature of the invention will now be explained with reference to Fig. 1.

A shaft $h$ provided with a pointer $u$, rigidly secured thereon, is carried by two systems of fibres, one of which consists of two fibres, $v_1$, $v_1'$, whereas the other of a single fibre $v_2$, interposed between the fibres $v_1$ and $v_1'$. Both systems of fibres are wound around the shaft $h$ but in opposite direction, i. e. they extend at opposite sides of the shaft $h$. The two systems are moved in opposite direction by a member of the gage, the position of the member depending on the value to be measured. The method of producing such countermovement of the two systems will be explained hereinafter.

If the fibres $v_1$, $v_1'$ move in one direction, e. g. in the direction I and the fibre $v_2$ in the opposite direction, i. e. in the direction III, the pointer $u$ will rotate in the direction shown by the arrow I, III. If the movements of the two systems of fibres are exactly the same, which may easily be achieved by the arrangement described further, the shaft $h$ is rotated, without carrying out any other movement; its axis remains permanently in the same place, the shaft $h$ being carried by the two systems of fibres without any other mounting i. e. without any bearings whatsoever. It is evident that the rotation of the shaft $h$ and therefore, of the pointer $u$, depends on the movements of the systems of fibres and may thus serve for measuring the extent of such movement.

In practical carrying out the invention each system comprises several fibres e. g. ten or even more for instance twenty or forty fibres. The fibres may be of any suitable material, either natural or synthetic and in a preferred embodiment consist of polyamid fibres, e. g. of a material known in the trade as "nylon."

Further it is evident that instead of the pointer any other suitable indicating element may be used, e. g. a mirror, a scale or the like and that the indicating element may be connected directly with the shaft or indirectly by a suitable transmission member.

Fig. 2 shows a different way of winding the fibre systems around the shaft of the pointer. According to Fig. 1, both fibre systems extend at the opposite sides of the shaft so as after passing around the shaft they proceed in direct continuation of their preceding portion.

According to Fig. 2, the two branches of each system of fibres are inclined towards each other so as to seemingly clamp the shaft therebetween.

In this Fig. 2, one system of fibres is shown in full whereas the other in dotted lines.

Fig. 3 shows a further method of winding the fibre systems around the shaft connected with the pointer. In this instance the fibre system $v_1$, consisting e. g. of several fibres, extends from the members which is displaced in accordance with the value to be measured and the displacement of which has to be gaged, passes around the shaft $h$, proceeds in straight continuation of the original direction to a roller $k$ mounted for rotation in the apparatus, passes around the roller and proceeds back, representing now the second fibre system $v_2$, is wound again around the shaft $h$ but in opposite direction, whereupon it continues in the same direction and is secured at its end to a spring $p$ attached to a fixed suspension $z$. If the member $s$ is displaced in one or the other direction in dependence on the value to be measured, the fibre system $v_1$ moves in the same direction, while the other fibre system $v_2$, which, as a matter of fact, is the continuation of the first fibre system beyond the roller $k$, moves at the same time in opposite direction to the first system exactly through the same distance; obviously the longitudinal movement of all portions of the fibre systems must be equal, as they are a single body wherein the reversal of direction of movement of one portion against the other is achieved by the roller $k$. The spring $p$ is tensioned or loosened according to the movement of the member $s$. It is apparent that in this case the two fibre systems wound around the shaft $h$ with the pointer $u$ carry out exactly the same movements in opposite directions towards each other, as described in connection with Fig. 1. The angle of deviation of the pointer is therefore, again proportionate to the movement of the member $s$, the displacement of which has to be measured.

In this case the gage comprises a bearing mounting the roller $k$. As the diameter of the roller $k$ could be selected greatly exceeding the diameter of the shaft $h$, the angular movement of the roller $k$ is much smaller than the angular movement of shaft $h$ and consequently, the friction and lost-motion of the measuring system are much smaller than in conventional systems in which the pointer shaft is journalled in bearings. This applies also to measuring systems in which the pointer shaft is journalled in bearings but rotated by a fibre system.

Fig. 4 shows the arrangement of a dial gage carried out according to the present invention.

In a cylindrical casing $m$ of the gage a rod $t$ is diametrically mounted for sliding movement, said rod ending at one side in a rounded point $o$ which is applied to the article to be measured or compared. The rod $t$ is biassed towards the article by a spring $x$, secured at one end to the rod $t$ and at its other end to the casing $m$ of the gage. The rod is further provided with a stop $n$, limiting the sliding movement of the rod $t$ to the outside by abutting against the inner wall of the casing $m$ of the gage.

The rod $t$ carries two pins or carriers $b$ secured at right angles thereto. Two nylon fibres $v_1$ and $v_1'$ are mounted under suitable tension between the two pins and wound around a shaft $h$ carrying a pointer $u$ which cooperates with a circular scale $c$ of which only a portion is shown. The scale $c$ is preferably provided on a ring or cover which is mounted for rotation on the casing $m$ in frictional engagement therewith, so that the zero point of the scale may easily be adjusted to any desired place on the circumference of the casing $m$.

One end of a cord $e$ is secured to the pin $b$ which is more remote from the point $o$ of the rod $t$, said cord passing around a roller $k$ mounted for rotation in the casing $m$. The continuation of the cord $e$ returns in opposite direction substantially parallel with the first portion of the cord and is secured to a cross-beam of a frame or carrier $r$, the other cross-beam of which is secured to a spring $f$ fastened at its other end to the casing $m$ of the gage. Yokes $g$ are provided above each cross-beam of the frame $r$, each yoke carrying two fibres $v_2$ and $v_2'$ extending at the opposite side of the shaft $h$ than the fibres $v_1$ and $v_1'$ and wound around the shaft $h$ in a direction opposite to that of the fibres $v_1$ and $v_1'$.

When the rod $t$ is moved in longitudinal direction, both fibre-systems carry out movements through exactly the same distance but in opposite direction and a movement as described in connection with Fig. 1 is produced. Consequently, the shaft $h$ is rotated in dependence on movement of the rod $t$, while the relative position of its axis remains unchanged. The friction and therefore also the lost-motion of the measuring system are much smaller than in conventional gages with bearings, as the diameter of the roller $k$ could be selected of sufficiently great size, as already explained.

The gage shown and described may, of course, be modified in various ways. So for instance the roller $k$ may be omitted and the two fibre systems arranged in accordance with Fig. 5, to be further described.

The ratio of movement depends, of course, on the dameter of the shaft $h$. The shaft carries out one complete revolution when the member, the displacement of which has to be measured, or the fibre system, moves longitudinally through a path equal approximately to $\pi(d+d')$, wherein $d$ denotes the diameter of the shaft $h$ and $d'$ the diameter of the fibre. The fibre being bent around the shaft with a very small radius of curvature, a slightly different diameter of the shaft has to be used in order to achieve a full revolution of the shaft for the given longitudinal movement of the fibre than corresponds to the diameter calculated from the above quoted relation. The difference is, however, very small and may be neglected for the calculation. Practically, the correct diameter of the shaft may be easily determined by a few trials. As the fibres ar every thin, for instance 0.008 mm., their diameter has practically no influence and will be neglected in the further considerations.

If the diameter of the shaft is slightly less than 0.318 mm. (which is $1/\pi$ mm.) one revolution of the shaft corresponds to a longitudinal movement of the rod $t$ (Fig. 4) through 1 mm. If the tip of the pointer moves on a radius of e. g. 20 mm. (which dimension corresponds approximately to the radius of the standard dial gages), the total length of travel of the pointer upon one full revolution is about 125 mm. If the circumference of the scale is divided by a graduation into 100 grades the longitudinal movement of the rod $t$ through 0.01 mm. is represented by a travel of the pointer $u$ through 1.25 mm. As tenths of a degree are estimated with sufficient accuracy and ease, thousandths of a millimeter of movement of the rod $t$ may be read on the scale, which is in accuracy achieved otherwise only by extremely exact apparatus, so-called "comparators." The gage according to the invention is, of course, incomparably simpler and cheaper than a comparator. The range of measurement may easily be from zero to 10 mm. or even more, for instance 15 mm.

The only component of the gage which has to be carefully and exactly machined is the shaft $h$. It is however easy to produce shafts of equal and accurate diameter by means of up-to-date machining technique, so that the present invention is excellently suitable for mass production of gages, even without employing highly skilled labour, which has been indispensable in the production of the known apparatus.

Fig. 5 shows in a diagrammatic representation another arrangement. The first fibre system $v_1$ extends from the member $s$, the displacement of which has to be measured, passes around the shaft $h$ with the pointer $u$ rigidly connected therewith and after being wound about this shaft from its right hand side extends further in straight continuation, its end being secured to a spring $p_1$ the other end of which it attached to a fixed suspension $z_1$. When the member $s$ moves in one or the other direction, the spring $p_1$ is tensioned or released. The other fibre system $v_2$ is immovable and is wound around the shaft $h$ in opposite direction at its other side from its left-hand side, said fibre system being secured at the lower one of its ends to fixed suspension $z_3$, whereas the other end of the fibre system $v_2$ is attached to a spring $p_2$ secured at its other end to a fixed suspension $z_2$. Spring $p_2$ merely serves to maintain fibre system $v_2$ under tension.

Preferably the fibres of the fibre systems should be mounted under suitable tension in frames similar to frame $r_2$ of Fig. 4 and such frames may be suspended on stronger fibres or cords which represent a continuation of the fibre systems concerned.

It may not be necessary for the pointer shaft to remain in its place and a small lateral translational movement of the axis of this shaft is not objectionable, as is the case when only relatively small angular movements of the pointer are to be expected, or if the scale is arranged accordingly. Thus, the apparatus may be simplified by arranging stationary that fibre system, which in the previously described arrangements is movable in a direction opposite to that of the fibre system which is connected with the displaceable member of the gage. Two such constructions are shown in Figs. 5 and 6.

As already mentioned in connection with Fig. 5, which of course is also true of the other views, the so-called fibre systems first of all involve the use of flexible elongated members $v_1$ and $v_2$, for example, which may obviously consist of single fibres or several associated fibres of various materials, or thin threads or cords may be used.

As the fibre systems are wrapped around the operating pointer shaft $u$, any pulling movement exerted by such a fibre, thread, cord or fibre system will be transmitted in terms of rotation to the shaft, as though the fibre system were a belt and the pointer shaft a pulley. The springs $p_1$ and $p_2$ which keep the fibre systems under tension, ensure proper operating friction between the fibres and the shaft so as to avoid losses and consequent inaccuracy of operation.

As at least two systems are used, and are wound in opposite directions, they are actually pitted one against the other so as to counterbalance each other in a smoothly cooperating manner. Then again, in these systems, the turns of the fibres enveloping the shaft virtually form supporting cradles for this shaft, obviating the necessity of using conventional bearings for the latter and thus eliminating friction losses. In this instance the axis of the shaft $h$ does not remain stationary and is displaced in a direction corresponding to the direction of movement of the first fibre system, that is, fibre system $v_1$. Such movement of the shaft $h$ is however, negligible and may be neglected or compensated by an excentric arrangement of the scale cooperating with the pointer. So for instance, in the above quoted example, in which the shaft has a diameter of 0.318 mm. the displacement of the axis of the shaft between its two end positions at a total deviation of the pointer of 90° is equal to $$\tfrac{1}{2} \tfrac{\pi}{360} \cdot 0.318 \cdot 90 = 0.05 \text{ mm.}$$

which is completely negligible. Such an arrangement may, therefore, be easily employed also in connection with larger deviations. In this case, namely, the free end of the pointer does not describe a circular path but a path taking the form of a prolate cycloid, which cycloid, however has a form very nearly that of a circular path.

In Fig. 6 another construction of this kind is shown. In this case, the first fibre system $v_1$ is attached at its one end to the displaceable member $s$, extends to pointer shaft $h$, and after being wound partly, or one or even several full turns around this shaft, extends parallel to its previous course but in the opposite direction to a fixed suspension $z_3$. The other fibre system $v_2$ is suspended by one of its ends to an end of a spring $p_1$, the other end of which is attached to a fixed suspension $z_1$, and extends to the pointer shaft $h$, and is wound partly, or one or even several full turns around this shaft and then extends in an opposite direction to a fixed suspension $z_2$. In this case both fibre systems continue after being wound around the pointer shaft $h$ in opposite directions to their previous course. The parts of these systems between the fixed suspensions $z_1$ and $z_3$ and the pointer shaft $h$ always remain stationary, and only the part of the system $v_1$ between the displaceable member $s$ and pointer shaft $h$ and the part of the other system $v_2$ between shaft $h$ and the end of the spring $p_1$ are moved by displacing the member $s$. Both parts of the individual fibre systems are shown in Fig. 6 as being parallel, but they could also form an angle.

The spring $p_1$ serves in this construction to maintain both fibre systems $v_1$ and $v_2$ under tension, and is tensed or released by movement of the displaceable member $s$ in one direction or the other.

It is obvious that also in this case, both fibre systems may be mounted in suitable frames.

While I have disclosed the principles of my invention in connection with several embodiments it will be understood that these embodiments are given by way of example only and not as limiting the scope of the invention as set forth in the appended claims.

Having now fully described my invention, I claim:

1. A dial gage comprising in combination a casing, a shaft, a pointer operatively connected therewith so as to be moved thereby, a scale cooperating with the pointer, a measuring member adapted to be displaced in dependence on the value to be measured, a set of carriers rigidly secured to said member, a system of fibres mounted on said carriers under suitable tension and wound around said shaft, a roller mounted for rotation in the casing, a frame carrying another system of fibres also wound around said shaft in opposite direction and at its opposite sides, a flexible element extending around said roller and secured by one end to one of said carriers and by its other end to the said frame, a spring rigidly anchored with one end in the casing, having its other end secured to the said frame.

2. A gage comprising in combination a casing; a shaft; an indicating element operatively connected therewith so as to be moved thereby; a measuring member slidably mounted in said casing adapted to be displaced in dependence on the value to be measured; two suspension springs, each having one end thereof connected to a fixed suspension on said casing; two systems of fibres wound around the said shaft in opposite directions at opposite sides, one system being connected at one of its ends to said measuring member of which the displacement is to be measured, whereas the other end of this system is connected to the other end of one of the two suspension springs, the other fibre system being attached at one of its ends to another fixed suspension on said casing, whereas the other end of this system is connected to one of the first mentioned fixed suspension by the other suspension spring.

3. A gage comprising in combination a casing; a shaft; an indicating element operatively connected therewith so as to be moved thereby; a measuring member slidably mounted in said casing adapted to be displaced in dependence on the value to be measured; a suspension spring attached at one end thereof to a fixed suspension on said casing; two systems of fibres wound around said shaft, in opposite directions, and the other part of each system after being wound around the shaft extending substantially in the direction contrary to the direction in which the previous part of this fibre system extends, one end of one system being connected to said displaceable measuring member and the other end of this one system being attached to another fixed suspension on said casing, while one end of the other system is attached to the first mentioned fixed suspension by mean of the suspension spring and the other end of this other system is attached to a further fixed suspension on said casing.

4. A gage comprising in combination, a supporting casing; a shaft; an indicating element operatively connected to said shaft so as to be moved thereby; a measuring member movably mounted on said supporting casing; and two systems of fibres wound around said shaft in opposite directions, one of said two systems of fibres comprising at least two fibres arranged spaced from each other so as to rotatably supports said shaft in at least two spaced loops and the other system of fibres comprising at least one fibre, one of said two systems of fibres being supported by said supporting casing, and the other being secured to said measuring member movable together with the same so as to be displaced in respect to the system of fibres supported by said supporting casing when said measuring member is displaced in respect to said supporting casing so that the relative movement of the two systems of fibres causes rotation of said shaft.

5. A gage, comprising in combination, a supporting casing; a shaft; an indicating element operatively connected to said shaft so as to be moved thereby; a measuring member movably mounted on said supporting casing; and two systems of fibres extending at a right angle to said shaft and wound around it in opposite directions, one of said two systems of fibres comprising at least two fibres arranged spaced from each other so as to rotatably support said shaft in at least two spaced loops and the other system of fibres comprising at least one fibre, one of said two systems of fibres being fixedly secured to said supporting casing, and the other being secured to said measuring member movable together with the same so as to be displaced in respect to the system of fibres supported by said supporting casing when said measuring member is displaced in respect to said supporting casing so that the relative movement of the two systems of fibres causes rotation of said shaft.

6. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber; suspension spring means secured at one end to said supporting casing and at the other end connected to one of said two systems of fibers movably supporting the same, the other system of fibers being secured to said measuring member movable together with the same; and coordinating means mounted on said supporting casing operatively connecting said two systems of fibers and causing said one movably supported system to move in a direction opposite to the direction of movement of said system of fibers secured to said measuring member when said measuring member is displaced in respect to said supporting casing so that the relative movement of the two systems of fibers causes rotation of said shaft.

7. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber, one of said two systems of fibers being movably supported on said supporting casing, and the other being secured to said measuring member movable together with the same; and coordinating means mounted on said supporting casing operatively connecting said two systems of fibers and causing said movably supported system to move in a direction opposite to the direction of movement of said system of fibers secured to said measuring member for a displacement equal to the distance said measuring member is displaced in respect to said supporting casing so that the relative movement of the two systems of fibers causes rotation of said shaft.

8. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber, one of said two systems of fibers being supported by said supporting casing, and the other being secured to said measuring member movable together with the same so as to be displaced in respect to said system of fibers supported by said supporting casing when said measuring member is displaced in respect to said supporting casing so that the relative movement of said two systems of fibers causes rotation of said shaft; and two carriers, one for each of said two systems of fibers for mounting each of said systems of fibers under suitable tension.

9. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber, one of said two systems of fibers being movably supported on said supporting casing, and the other being secured at one end to said measuring member movable together with the same; coordinating means mounted on said supporting member operatively connecting said two systems of fibers and causing said movably supported system to move in a direction opposite to the direction of movement of the system of fibers secured to said measuring member when said measuring member is displaced in respect to said supporting casing so that the relative movement of said two systems of fibers causes rotation of said shaft; and two carriers, one for each of said two systems of fibers for mounting each of said systems of fibers under suitable tension.

10. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber, one of said two systems of fibers being movably supported on said supporting casing, and the other being secured to said measuring member movable together with the same; coordinating means mounted on said supporting casing operatively connecting said two systems of fibers and causing said movably supported system to move in a direction opposite to the direction of movement of the system of fibers secured to said measuring member for a distance equal to the displacement of said measuring member when said measuring member is displaced in respect to said supporting casing so that the relative movement of the two systems of fibers causes rotation of said shaft; and two carriers, one for each of said two systems of fibers for mounting each of said systems of fibers under suitable tension.

11. A gage, comprising in combination, a supporting casing; a shaft; an indicating element operatively connected to said shaft so as to be moved thereby; a measuring member movably mounted on said supporting casing; two systems of fibers extending at a right angle to said shaft and wound around it in opposite directions, one of said two systems of fibers comprising at least two fibers arranged spaced from each other so as to rotatably support said shaft in at least two spaced loops and the other system of fibers comprising at least one fiber, one of said two systems of fibers being movably supported on said supporting casing, and the other being secured to said measuring member movable together with the same; coordinating means including a roller rotatably mounted on said supporting casing, and a flexible cord passing over said roller connecting said two systems of fibers and causing said movably supported system to move in a direction opposite to the direction of movement of the system of fibers secured to said measuring member for a distance equal to the displacement of said measuring member when said measuring member is displaced in respect to said supporting casing so that the relative movement of said two systems of fibers causes rotation of said shaft; and two carriers, one for each of said last-mentioned two systems of fibers for mounting each of said systems of fibers under suitable tension.

MIROSLAV NĚMECKÝ.

References Cited in the file of this patent
UNITED STATES PATENTS

| Number | Name | Date |
|---|---|---|
| 607,898 | Todd | July 26, 1898 |
| 1,664,833 | Schaper | Apr. 3, 1928 |
| 2,106,993 | Bostic | Feb. 1, 1938 |